(12) United States Patent
Trahan et al.

(10) Patent No.: US 10,089,403 B1
(45) Date of Patent: Oct. 2, 2018

(54) MANAGING NETWORK BASED STORAGE

(75) Inventors: Matthew L. Trahan, Seattle, WA (US);
Brett R. Taylor, Bainbridge Island, WA
(US); Jonathan A. Jenkins, Seattle,
WA (US)

(73) Assignee: Amazon Technologies, Inc., Seattle,
WA (US)

( * ) Notice: Subject to any disclaimer, the term of this
patent is extended or adjusted under 35
U.S.C. 154(b) by 808 days.

(21) Appl. No.: 13/222,950

(22) Filed: Aug. 31, 2011

(51) Int. Cl.
*G06F 17/30* (2006.01)
*H04L 29/08* (2006.01)

(52) U.S. Cl.
CPC .... *G06F 17/30876* (2013.01); *G06F 17/3089*
(2013.01); *H04L 67/02* (2013.01)

(58) Field of Classification Search
CPC .......... G06F 15/16; G04L 29/02; G04L 29/06
USPC ....................................................... 709/217
See application file for complete search history.

(56) References Cited

U.S. PATENT DOCUMENTS

| | | | |
|---|---|---|---|
| 5,634,064 A | 5/1997 | Warnock et al. | |
| 5,872,850 A | 2/1999 | Klein et al. | |
| 5,961,593 A | 10/1999 | Gabber et al. | |
| 6,049,812 A | 4/2000 | Bertram et al. | |
| 6,108,637 A | 8/2000 | Blumenau | |
| 6,138,156 A | 10/2000 | Fletcher et al. | |
| 6,144,991 A * | 11/2000 | England | 709/205 |
| 6,182,133 B1 | 1/2001 | Horvitz | |
| 6,195,679 B1 | 2/2001 | Bauersfeld et al. | |
| 6,430,624 B1 | 8/2002 | Jamtgaard et al. | |
| 6,549,941 B1 | 4/2003 | Jaquith et al. | |
| 6,560,620 B1 | 5/2003 | Ching | |
| 6,625,624 B1 | 9/2003 | Chen et al. | |
| 6,654,784 B1 | 11/2003 | Wei | |
| 6,704,024 B2 | 3/2004 | Robotham et al. | |
| 6,728,763 B1 | 4/2004 | Chen | |
| 6,785,864 B1 | 8/2004 | Te et al. | |
| 6,871,213 B1 | 3/2005 | Graham et al. | |
| 6,871,236 B2 | 3/2005 | Fishman et al. | |
| 6,931,439 B1 | 8/2005 | Hanmann et al. | |
| 6,944,665 B2 | 9/2005 | Brown et al. | |
| 6,963,850 B1 | 11/2005 | Bezos et al. | |

(Continued)

FOREIGN PATENT DOCUMENTS

| | | |
|---|---|---|
| JP | 2004-193979 | 7/2004 |
| WO | WO 0167233 A2 * | 9/2001 |
| WO | WO 2013/003631 A2 | 1/2013 |

OTHER PUBLICATIONS

NPL1—Title: Interposed Request Routing for Scalable Network Storage; OSDI Proceedings 2000; Dept. Computerscience; Duke University; by Anderson et al.*

(Continued)

*Primary Examiner* — Thomas J Dailey
(74) *Attorney, Agent, or Firm* — Knobbe, Martens, Olson, and Bear, LLP

(57) ABSTRACT

Systems, methods and interfaces for the selective management of information collected by a software browser application are provided. The software browser application obtains content from a network resource, such as a Web page. The software browser application presents, among other controls, a graphical icon that is representative of a command to initiate a network-based service, such as network-based storage. The software browser application can also group similar content to provide for collective network service commands.

19 Claims, 12 Drawing Sheets

(56) References Cited

U.S. PATENT DOCUMENTS

| | | | |
|---|---|---|---|
| 7,003,442 B1 | 2/2006 | Tsuda | |
| 7,051,084 B1 | 5/2006 | Hayton et al. | |
| 7,054,952 B1 | 5/2006 | Schwerdtfeger et al. | |
| 7,082,476 B1 | 7/2006 | Cohen et al. | |
| 7,085,736 B2 | 8/2006 | Keezer et al. | |
| 7,089,316 B2* | 8/2006 | Andersen et al. | 709/229 |
| 7,159,023 B2 | 1/2007 | Tufts | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,428,540 B1* | 9/2008 | Coates et al. | |
| 7,483,983 B1 | 1/2009 | Bonefas et al. | |
| 7,509,397 B1 | 3/2009 | Totty et al. | |
| 7,543,059 B2 | 6/2009 | Johnson et al. | |
| 7,610,382 B1 | 10/2009 | Siegel | |
| 7,624,047 B1 | 11/2009 | Round | |
| 7,734,732 B2* | 6/2010 | Soelberg | H04L 63/08 |
| | | | 709/217 |
| 7,792,944 B2 | 9/2010 | DeSantis et al. | |
| 7,831,582 B1 | 11/2010 | Scofield et al. | |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,103,742 B1 | 1/2012 | Green | |
| 8,185,621 B2 | 5/2012 | Kasha | |
| 8,195,767 B2 | 6/2012 | Albrecht et al. | |
| 8,224,964 B1 | 6/2012 | Fredrickson et al. | |
| 8,249,904 B1 | 8/2012 | DeSantis et al. | |
| 8,271,836 B2 | 9/2012 | Hawkins | |
| 8,271,887 B2 | 9/2012 | Offer et al. | |
| 8,316,124 B1 | 11/2012 | Baumback et al. | |
| 8,336,049 B2 | 12/2012 | Medovich | |
| 8,577,963 B2 | 11/2013 | Trahan et al. | |
| 8,706,860 B2 | 4/2014 | Trahan et al. | |
| 8,799,412 B2 | 8/2014 | Trahan et al. | |
| 8,914,514 B1 | 12/2014 | Jenkins et al. | |
| 2001/0039490 A1 | 11/2001 | Verbitsky et al. | |
| 2001/0052006 A1 | 12/2001 | Barker et al. | |
| 2002/0015042 A1 | 2/2002 | Robotham et al. | |
| 2002/0026511 A1 | 2/2002 | Garcia-Luna-Aceves et al. | |
| 2002/0030703 A1 | 3/2002 | Robertson et al. | |
| 2002/0073155 A1 | 6/2002 | Anupam et al. | |
| 2002/0103846 A1 | 8/2002 | Zisapel et al. | |
| 2002/0194302 A1 | 12/2002 | Blumberg | |
| 2003/0023712 A1 | 1/2003 | Zhao et al. | |
| 2003/0041106 A1 | 2/2003 | Tuli | |
| 2004/0010543 A1 | 1/2004 | Grobman | |
| 2004/0066397 A1 | 4/2004 | Walker et al. | |
| 2004/0083294 A1 | 4/2004 | Lewis | |
| 2004/0139208 A1 | 7/2004 | Tuli | |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2005/0278698 A1 | 12/2005 | Verco | |
| 2006/0015574 A1 | 1/2006 | Seed et al. | |
| 2006/0085766 A1 | 4/2006 | Dominowska et al. | |
| 2006/0095336 A1 | 5/2006 | Heckerman et al. | |
| 2006/0112167 A1 | 5/2006 | Steele et al. | |
| 2006/0122889 A1 | 6/2006 | Burdick et al. | |
| 2006/0168510 A1 | 7/2006 | Bryar et al. | |
| 2006/0173819 A1* | 8/2006 | Watson | G06F 17/30861 |
| 2006/0184421 A1 | 8/2006 | Lipsky et al. | |
| 2006/0248195 A1 | 11/2006 | Toumura et al. | |
| 2006/0248442 A1 | 11/2006 | Rosenstein et al. | |
| 2006/0248453 A1 | 11/2006 | Bennett et al. | |
| 2006/0277167 A1 | 12/2006 | Gross et al. | |
| 2006/0288112 A1* | 12/2006 | Soelberg | H04L 63/0428 |
| | | | 709/231 |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0061700 A1 | 3/2007 | Kothari et al. | |
| 2007/0089174 A1* | 4/2007 | Bader | G06F 21/10 |
| | | | 726/32 |
| 2007/0094241 A1 | 4/2007 | Blackwell et al. | |
| 2007/0118803 A1 | 5/2007 | Walker et al. | |
| 2007/0124693 A1 | 5/2007 | Dominowska et al. | |
| 2007/0139430 A1 | 6/2007 | Korn et al. | |
| 2007/0168535 A1 | 7/2007 | Ikonen et al. | |
| 2007/0240160 A1 | 10/2007 | Paterson-Jones et al. | |
| 2007/0288589 A1 | 12/2007 | Chen et al. | |
| 2007/0288855 A1 | 12/2007 | Rohrabaugh et al. | |
| 2008/0028334 A1 | 1/2008 | De Mes | |
| 2008/0034019 A1* | 2/2008 | Cisler et al. | 707/204 |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0301180 A1* | 12/2008 | Klassen | H04M 1/72555 |
| 2008/0320225 A1 | 12/2008 | Panzer et al. | |
| 2009/0012969 A1 | 1/2009 | Rail et al. | |
| 2009/0094339 A1 | 4/2009 | Allen et al. | |
| 2009/0104934 A1* | 4/2009 | Jeong | H04N 1/00132 |
| | | | 455/556.1 |
| 2009/0132640 A1 | 5/2009 | Verma et al. | |
| 2009/0158141 A1 | 6/2009 | Bauchot et al. | |
| 2009/0164924 A1 | 6/2009 | Flake et al. | |
| 2009/0187819 A1 | 7/2009 | Bonefas et al. | |
| 2009/0204478 A1 | 8/2009 | Kaib et al. | |
| 2009/0217199 A1 | 8/2009 | Hara et al. | |
| 2009/0237728 A1 | 9/2009 | Yamamoto | |
| 2009/0248622 A1* | 10/2009 | Zhang | G06F 17/30864 |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327517 A1 | 12/2009 | Sivasubramanian et al. | |
| 2009/0327914 A1 | 12/2009 | Adar et al. | |
| 2010/0036740 A1 | 2/2010 | Barashi | |
| 2010/0057639 A1 | 3/2010 | Schwarz et al. | |
| 2010/0088647 A1* | 4/2010 | Jing | G06F 17/30274 |
| | | | 715/838 |
| 2010/0125507 A1 | 5/2010 | Tarantino, III et al. | |
| 2010/0131594 A1 | 5/2010 | Kashimoto | |
| 2010/0138293 A1 | 6/2010 | Ramer et al. | |
| 2010/0218106 A1 | 8/2010 | Chen et al. | |
| 2010/0293190 A1 | 11/2010 | Kaiser et al. | |
| 2010/0312750 A1 | 12/2010 | Moore et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0087690 A1* | 4/2011 | Cairns | G06F 17/30097 |
| | | | 707/769 |
| 2011/0119352 A1 | 5/2011 | Perov | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0208822 A1 | 8/2011 | Rathod | |
| 2011/0246873 A1 | 10/2011 | Tolle et al. | |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0022942 A1 | 1/2012 | Holloway et al. | |
| 2012/0054316 A1 | 3/2012 | Piazza et al. | |
| 2012/0072821 A1 | 3/2012 | Bowling | |

(56) References Cited

U.S. PATENT DOCUMENTS

| | | |
|---|---|---|
| 2012/0084433 A1 | 4/2012 | Bar-Caspi et al. |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0215834 A1 | 8/2012 | Chen et al. |
| 2012/0215919 A1 | 8/2012 | Labat et al. |
| 2012/0284629 A1 | 11/2012 | Peters et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031461 A1 | 1/2013 | Hou et al. |
| 2013/0066848 A1* | 3/2013 | Tuttle .................. G06F 17/3089 707/711 |
| 2013/0080611 A1 | 3/2013 | Li et al. |
| 2014/0067923 A1 | 3/2014 | Trahan et al. |

OTHER PUBLICATIONS

Rao, H.C.-H., et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Bango, Rey, "How JS & Ajax work in Opera Mini 4", Nov. 2, 2007, XP055050107, Retrieved from the Internet.

Brinkmann, M., "Record and Share your browser history with Hooeey," ghacks.net, Feb. 26, 2008, 6 pages, printed on Jan. 25, 2013.

Considine, A., "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber, et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M., Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

Baumann, A., et al., Enhancing Stem Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Lubonski, M., et al., An Adaptation Architecture to Improve User-Perceived QoS of Multimedia Services for Enterprise Remote Desktop Protocols. NG12005, pp. 149-156, 2005.

International Search Report and Written Opinion in PCT/US2012/044711 dated Jan. 25, 2013.

International Preliminary Report on Patentability for PCT/US2012/044711 dated Jan. 7, 2014.

International Search Report and Written Opinion in PCT/US2012/044716 dated Sep. 25, 2012.

International Preliminary Report on Patentability for PCT/US2012/044716 dated Jan. 7, 2014.

* cited by examiner

MANAGING NETWORK BASED STORAGE

BACKGROUND

Generally described, computing devices and communication networks can be utilized to exchange information. In a common application, a computing device can request content from another computing device via a communication network. For example, a user at a personal computing device can utilize a software browser application, typically referred to as a software browser application, to request a network resource (e.g., a Web page) from a server computing device via the Internet. In such embodiments, the user computing device can be referred to as a client computing device and the server computing device can be referred to as a content provider.

With reference to an illustrative example, a request for content is typically initiated by the selection or input of a network resource identifier, such as a Uniform Resource Locator ("URL"), corresponding to a specific Web site. For example, a user can enter a specific URL, utilize a stored history previously accessed URLs or use an input device to select from a listing of a set of URLs. Responsive to the request for content, the client computing device obtains content associated with the requested Web page and renders the requested content on the client computing device. Once the content has been rendered, a user can access the rendered content via user input devices, such as touch screens, pens, mice, keyboards, and the like.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Generally described, aspects of the present disclosure relate to the management of content and information corresponding to the access of content. Specifically, aspects of the present disclosure relate to the selective management of resources obtained by a software browser application and rendered to a user. The software browser application obtains resources from a network resource, such as a Web page. In one embodiment, the software browser application presents, among other controls or icons, a graphical icon that is representative of a command to initiate a network based service on selected resources, such as a network-based storage service. Responsive to a selection of the graphical icon, the software browser application can transmit the appropriate network-based service request for the selected resources.

As used herein, reference to "client computing device" will not necessarily be limited to any particular type of device or to the illustrative examples of devices described herein. Still further, reference to "software browser application" will not necessarily be limited as to any type of software application and does not prevent the incorporation of aspects of the present disclosure into other types of software applications or operating system functionality. Although aspects of the present disclosure will be described with regard to an illustrative network environments and component interactions, flow diagrams, graphical icons and screen interfaces, one skilled in the relevant art will appreciate that the disclosed embodiments are illustrative in nature and should not be construed as limiting.

Figure 1A:
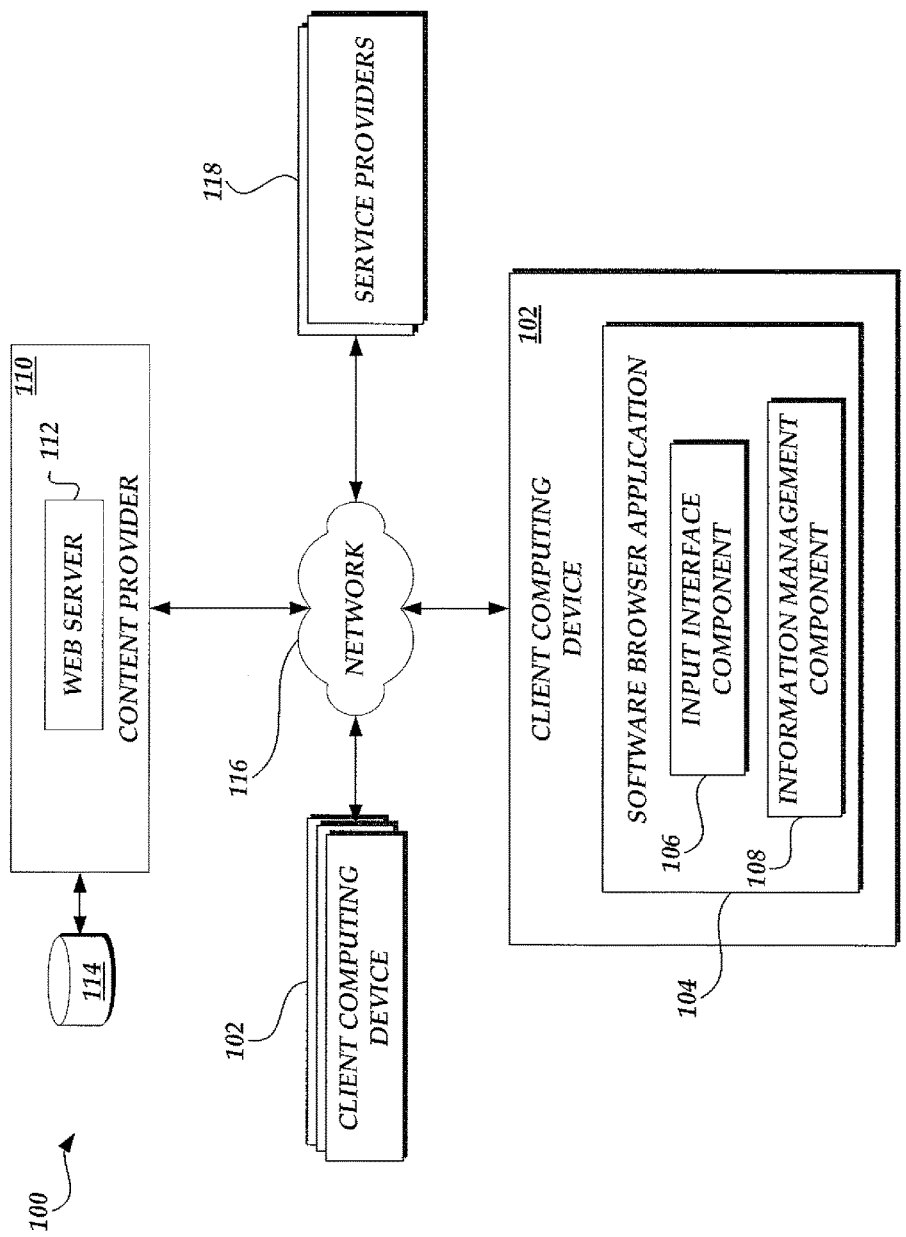
FIG. 1A is a block diagram illustrative of a content delivery environment including a number of client computing devices and a content provider.

With reference now to FIG. 1A, a block diagram illustrative of a content delivery environment 100 for accessing information from network resources and managing information associated with the access of the network resources will be described. As illustrated in FIG. 1A, the content delivery environment 100 includes a number of client computing devices 102 for requesting content from content providers 110. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. The content delivery environment 100 can include any of number and various kinds of client computing devices 102.

In an illustrative embodiment, the client computing devices 102 include necessary hardware and software components for establishing communications over a communication network 116, such as a wide area network or local area network. For example, the client computing devices 102 may be equipped with networking equipment and software browser applications that facilitate communications via the Internet or an intranet.

Illustratively, the client computing devices 102 may have varied local computing resources such as central processing units and architectures, memory, mass storage, graphics processing units, communication network availability and bandwidth, etc. Generally, however, each computing device 102 may include one or more processing units, such as one or more CPUs. The computing device 102 may also include system memory, which may correspond to any combination of volatile and/or non-volatile storage mechanisms. The system memory may store information that provides an operating system component, various program modules, program data, or other components. The computing device 102 performs functions by using the processing unit(s) to execute instructions provided by the system memory. The computing device may also include one or more input devices (keyboard, mouse device, specialized selection keys, touch screen interface, stylus, etc.) and one or more output devices (displays, printers, audio output mechanisms, etc.). The computing device 102 may also include one or more types of removable storage and one or more types of non-removable storage. Still further, the computing device 102 can include communication components for facilitating communication via wired and wireless communication networks, such as the wireless communication network 116.

As illustrated in FIG. 1A, the client computing devices 102 can include, among other hardware or software components, a software browser application 104 for facilitating access to network resources, such as Web pages provided by the content provider 110. The software browser application 104 can correspond to a stand-alone software application or be integrated in conjunction with other software applications, software components or operating environments. Illustratively, the software browser application 104 includes an input interface component 106 for obtaining information associated with the selection of various user input and making a determination, among other commands, whether the input corresponds to a network based service request. The input interface component 106 is further operable for transmitting network based service requests to one or more network service providers 118. The software browser application 104 also includes an information management component 108 for processing requests to characterize object and to process the network based services command. Although the input interface component 106 and information management component are illustrated as logically included in the software browser application 104, the components may be implemented in other software applications, combined or implemented as separate, stand-alone software applications.

The content delivery environment 100 can also include one or more content providers 110 in communication with the one or more client computing devices 102 or other service providers via the communication network 116. The content provider 110 illustrated in FIG. 1A corresponds to a logical association of one or more computing devices. Specifically, the content provider 104 can include a web server component 112 corresponding to one or more server computing devices for obtaining and processing requests for content (such as Web pages) from the client computing devices 102. One skilled in the relevant art will appreciate that the content provider 110 can be associated with various additional computing resources, such as additional computing devices for administration of content and resources, domain name service ("DNS") name servers, application servers, proxy servers, and the like. For example, although not illustrated in FIG. 1A, the content provider 110 can be associated with one or more DNS name server components that would be authoritative to resolve client computing device DNS queries corresponding to a domain of the content provider. Although only a single content provider 110 is illustrated in FIG. 1A, the content delivery environment 100 can include any number of content providers, including various grouping of content providers.

With continued reference to FIG. 1A, the content delivery environment 100 can include any number of additional network service providers 118 that can correspond to various network-based service providers, such as search service providers, content management service providers, content delivery service providers, network-based storage providers, social network service providers, messaging providers and the like. Illustratively, the network service providers 118 may be associated with any number of computing devices that can provide services for resources rendered on the client computing devices 102, such as network based storage, image processing, messaging, and the like. The network service providers 118 may be controlled by one or more entities. Additionally, the network service providers 118 may be integrated, or otherwise combined, to provide integrated services in response to client computing device requests.

Figure 1B:
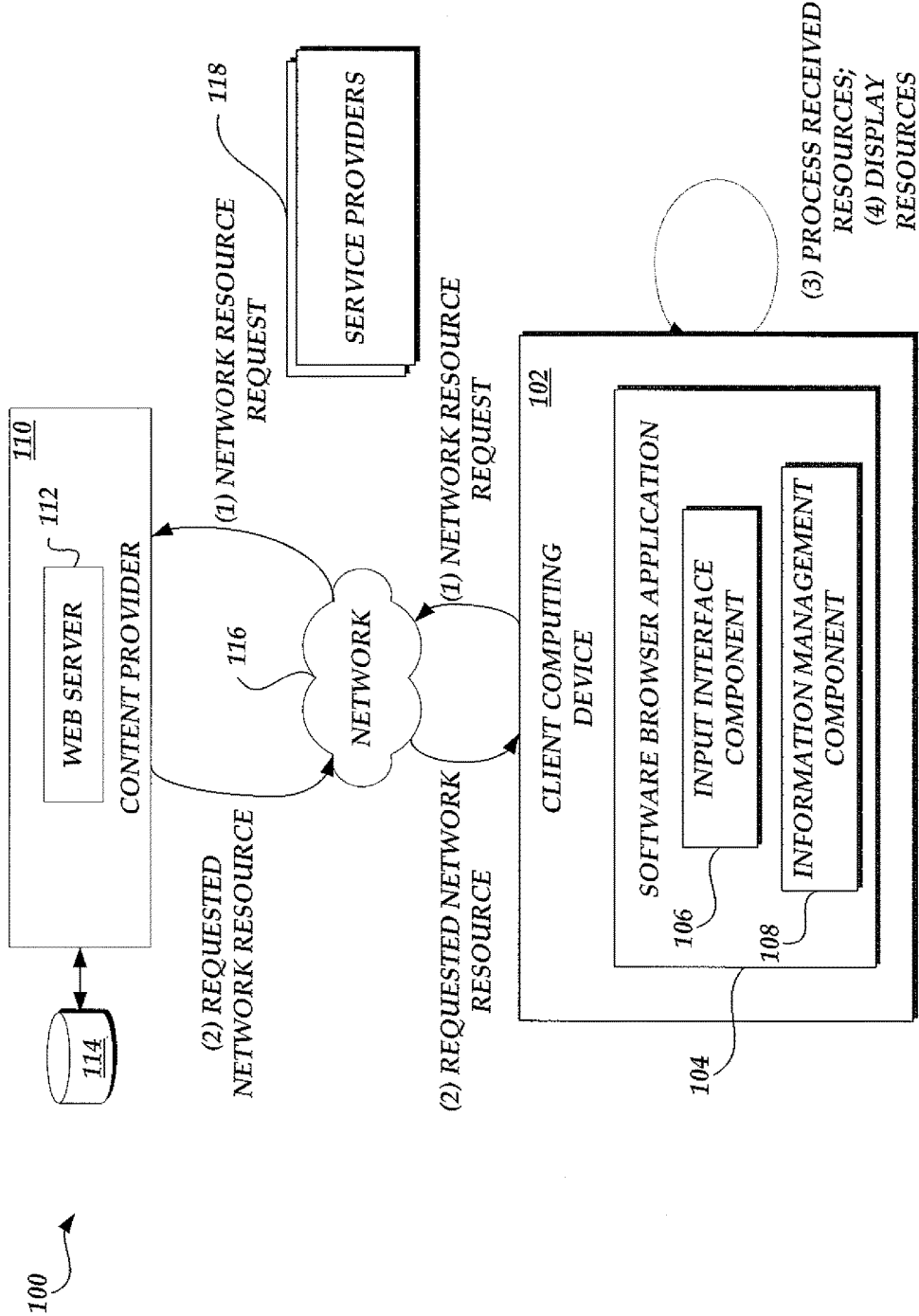
FIGS. 1B and 1C are block diagrams of the content delivery environment of FIG. 1A illustrating the accessing of network resources and the processing of network based service requests corresponding to the received resources.
Figure 1C:
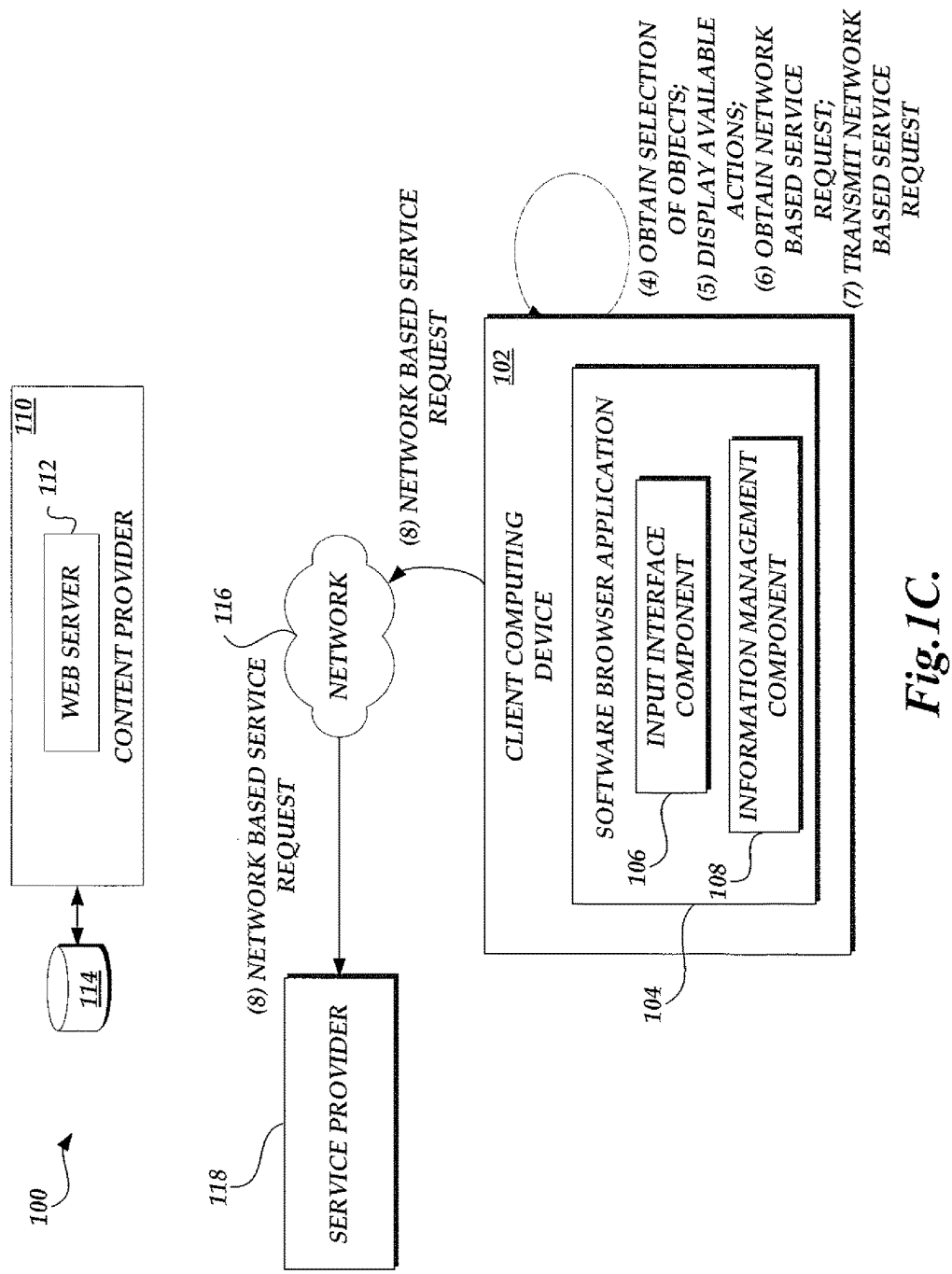

With reference now to FIGS. 1B and 1C, the interaction between various components of the content delivery environment 100 of FIG. 1A will be illustrated. Specifically, FIG. 1B illustrates the interaction between various components of the content delivery environment 100 for the exchange of content between a client computing device 102 and a content provider 110 via communication network 116. FIG. 1C illustrates the interaction between various components of the content delivery environment 100 with regard to the processing of an integrated command to delete information associated with a currently accessed network resource and to access a previously accessed network resource. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 1B, illustratively, a client computing device 102 initiates a request for content by identification of a desired network resource, such as via identification of a specific URL (1). In one example, the software browser application 104 receives an input of a specific URL to access, such via a keyboard associated with the client computing device 102. In another example, a user can manipulate a graphical user interface to select an object, such as a selection of an embedded hyperlink or selection of an entry in a "Favorites" listing. The manipulation of the graphical user interface results in the software browser application 104 receiving or recalling the information (e.g., the URL or network address) used to access the desired network resource. As illustrated in FIG. 1B, the content request is received by an appropriate content provider 110 and processed to provide the request network resource(s) (2).

Upon accessing the network resource and receiving any associated content from the content provider 110, the client computing device 102, such as through the software browser application 104, processes the requested resources and renders the received resources as appropriate (3). Although not illustrated in FIG. 1B, the processing of the resources by the software browser application 104 can include multiple iterative resource requests corresponding to an original resource (such as a Web page) and a number of embedded resources. One skilled in the relevant art will appreciate that rendering of the resource can result in the generation of one or more display objects on a display associated with the client computing device 102. The display objects may correspond to the resource or be representative of the resource (e.g., a thumbnail image).

With reference to FIG. 1C, at some point after receiving, processing and rendering the network resources, the software browser application 104 obtains an input from a user that is interpreted as a selection of one or more of the display objects corresponding to the network resources and a command to access one or more network based services (4). Responsive to the selection of the display objects, the software browser application 104 can determine available actions or network based services based on a user account, meta-data associated with the resources, and the like. The list of available actions or network based services can be provided to a user in order to receive a selection of an action or selection of a network based service (5). For example, a user may be presented with a menu indicative of the availability of network based storage for selected image objects or the ability to post the selected image objects to a network based social network. Based on the selected actions or network based services (6), the software browser application 104 transmits a request (with appropriate information) to one or more network service providers 118 (7) & (8).

Figure 2A:
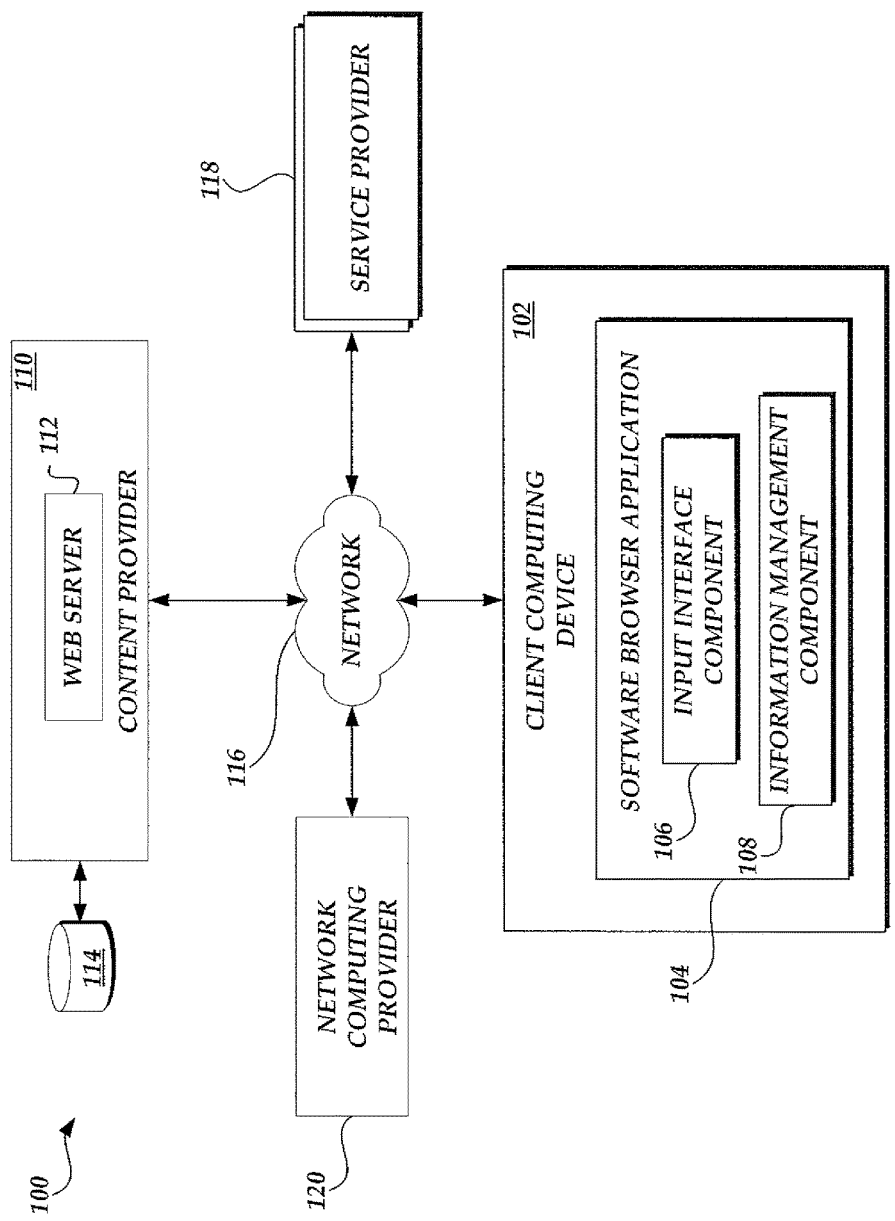
FIG. 2A is a block diagram illustrative of a content delivery environment including a number of client computing devices, a content provider, and a network computing provider.

With reference now to FIG. 2A, a block diagram illustrative of an alternative embodiment of a content delivery environment 100 for accessing information from network resources and managing information associated with the access of the network resources will be described. As illustrated in FIG. 2A, the content delivery environment 100 includes a number of client computing devices 102 for requesting content from content providers 110. In an illustrative embodiment, the client computing devices 102, content providers 110 and network resources 118 can operate in a manner substantially similar to the functionality discussed with regard to FIG. 1A.

With continued reference to FIG. 2A, the content delivery environment 100 can also include a network computing provider 120 in communication with the one or more client computing devices 102, the content provider 110 and the network resources 118 via the communication network 116. The network computing provider 120 corresponds to a logical association of one or more computing devices associated with a network computing provider. Specifically, the network computing provider 120 can include a number of Point of Presence ("POP") locations that correspond to nodes on the communication network 116. Each POP includes a network computing component (NCC) for hosting applications, such as data streaming applications, via a number of instances of a virtual machine, generally referred to as an instance of an NCC.

One skilled in the relevant art will appreciate that NCCs utilize physical computing device resources and software to provide multiple instances of a virtual machine or to dynamically cause the creation of instances of a virtual machine. As applied to the present disclosure, the virtual machine instances execute a software browser application that is in communication with the software browser application 104 on the client computing device 102. In this embodiment, the software browser application executed on the virtual machine instance works in conjunction with the software browser application 104 on the client computing device 102 to process content. The NCCs may further include additional software or hardware components that facilitate communications including, but not limited to, load balancing or load sharing software or hardware components for selecting instances of a virtual machine supporting a requested application or providing information to a DNS nameserver to facilitate request routing.

Figure 2B:
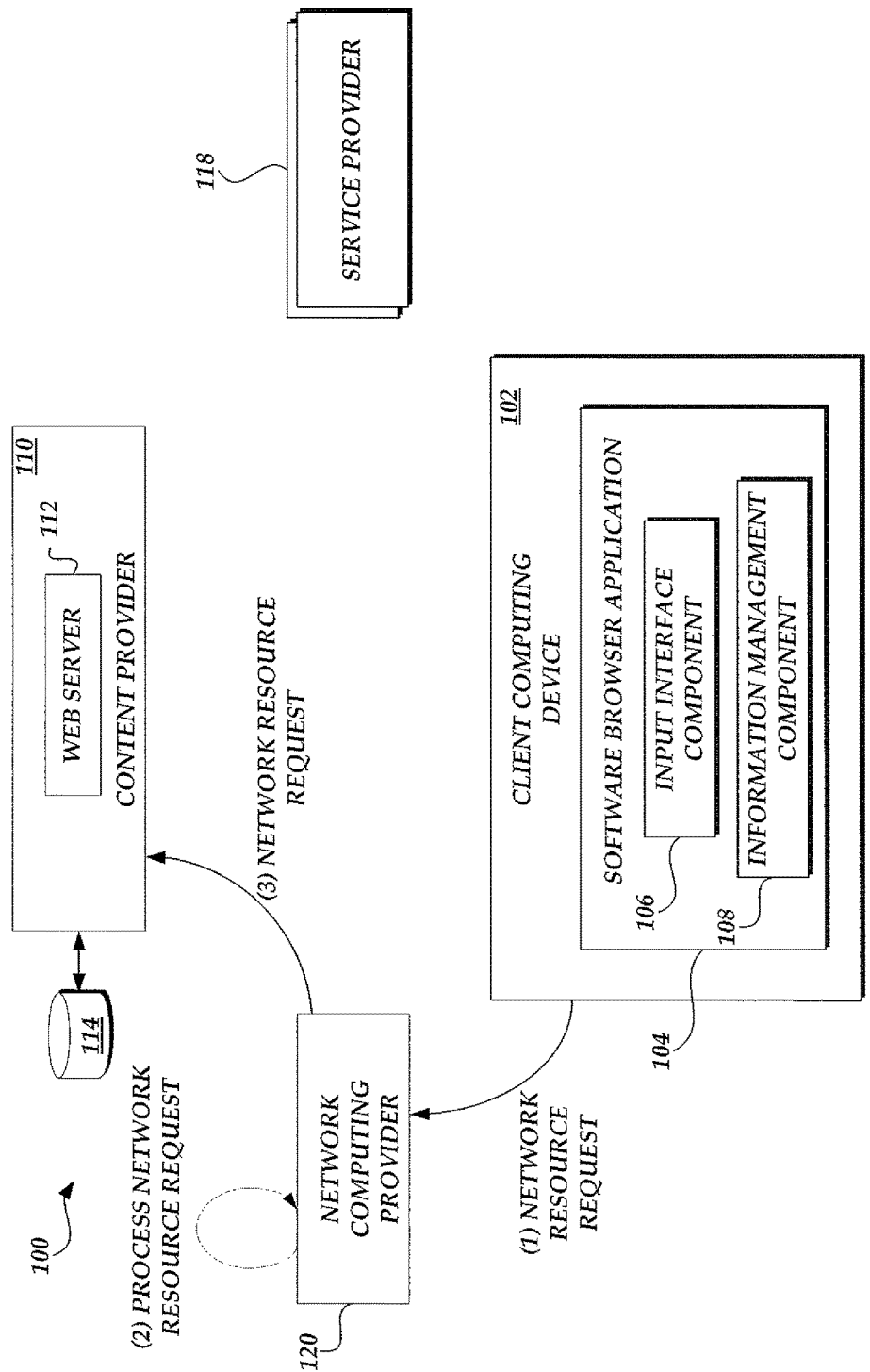
FIGS. 2B-2D are block diagrams of the content delivery environment of FIG. 1A illustrating the accessing of network resources and the processing of network based service requests corresponding to the received resources.
Figure 2C:
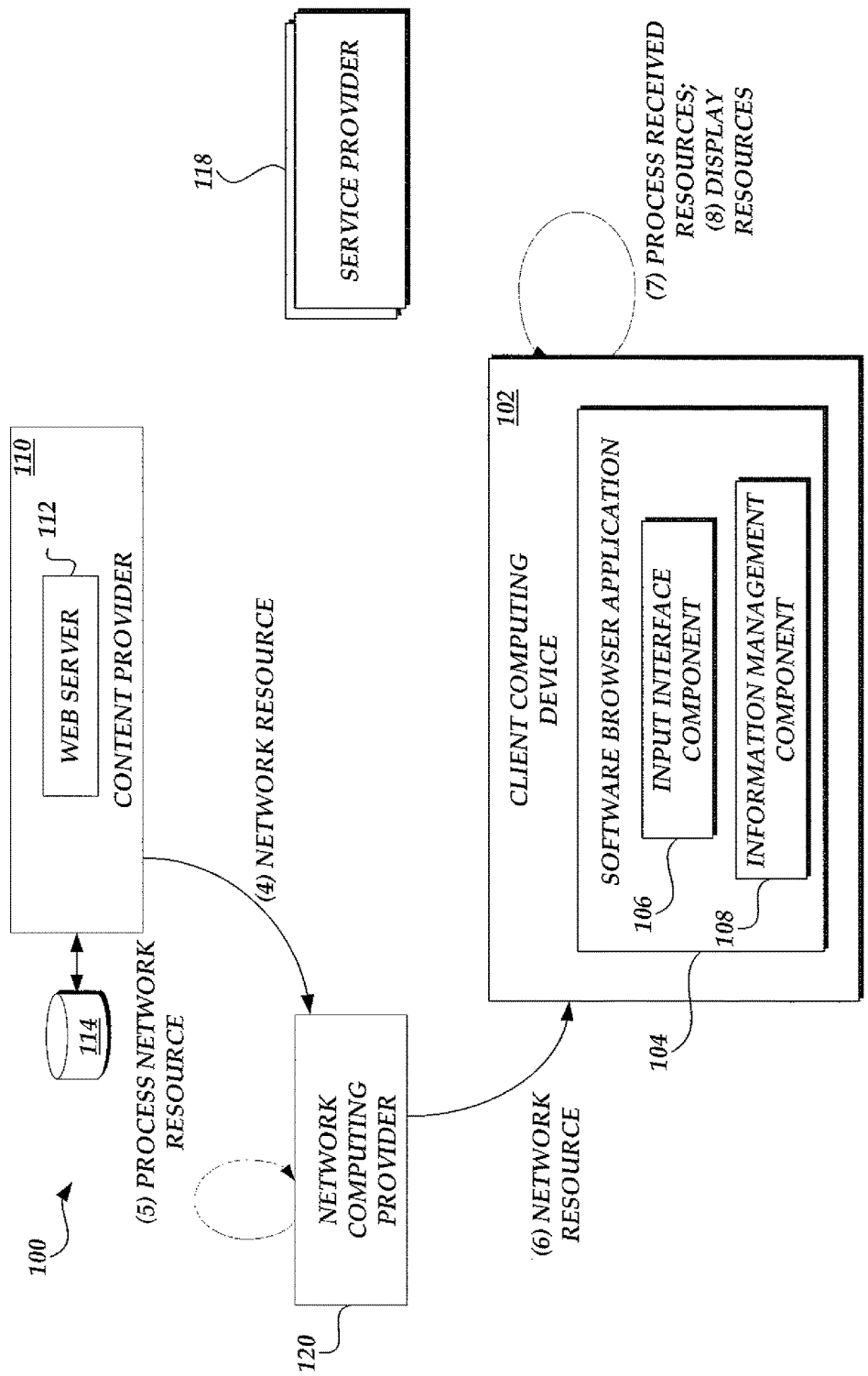
Figure 2D:
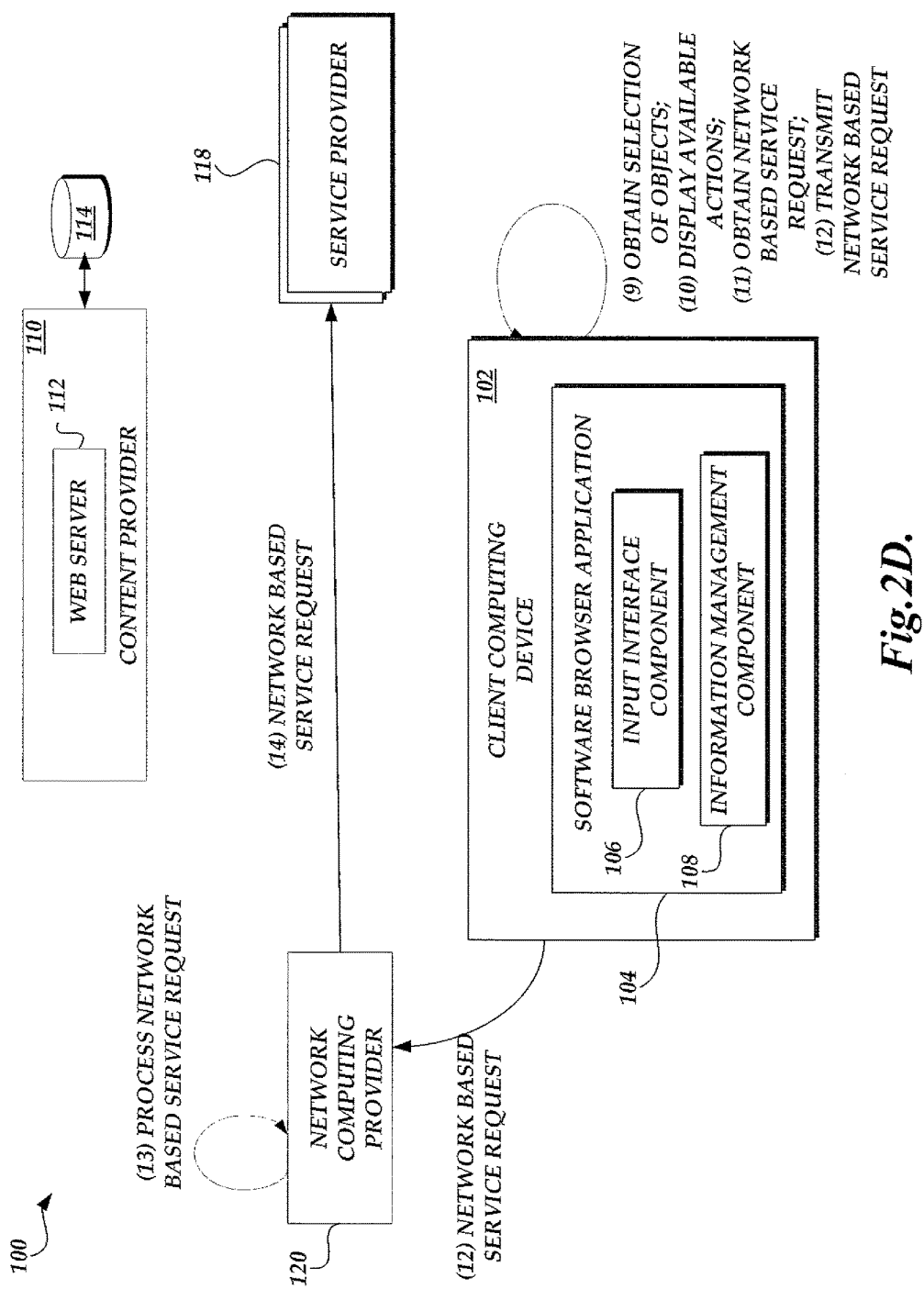

With reference now to FIGS. 2B-2D, the interaction between various components of the content delivery environment 100 of FIG. 2A will be illustrated. Specifically, FIG. 2B illustrates the interaction between various components of the content delivery environment 100 for the exchange of content between a client computing device 102, the network computing provider 120, and a content provider 110 via communication network 116. FIGS. 2C and 2D illustrate the interaction between various components of the content delivery environment 100 with regard to the processing of an integrated command to delete information associated with a currently accessed network resource and to access a previously accessed network resource. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2B, illustratively, a client computing device 102 initiates a request for content by identification of a network resource, such as via a URL (1). As previously described, in one example, the software browser application 104 receives an input of a specific URL to access, such via a keyboard associated with the client computing device 102. In another example, a user can manipulate a graphical user interface to select an object, such history of recently accessed URLs, such that the software browser application 104 is provided the information required to access the network resource.

As illustrated in FIG. 2B, the content request is received by the network computing provider 120, which processes the content request (2). In one embodiment, the network computing provider 120 can instantiate a virtual machine instance to execute a software browser application that will work in parallel with the software browser application 104. In another embodiment, network computing provider 120 may already have an instantiated virtual machine instance for processing the content request. Thereafter, a content request is transmitted to an appropriate content provider 110 and processed by the content provider to provide the requested network resource to the network computing provider 120 and the client computing device 102 (3). Illustrative embodiments for accessing content based on software browser applications executing on client computing devices 102 and network computing provider components are described in co-pending and commonly owned U.S. patent application Ser. No. 13/174,615, entitled "Remote Browsing Session Management," filed on Jun. 30, 2011, and incorporated by reference in its entirety herein.

With reference to FIG. 2C, in response to the request from the network computing provider 120, the content provider 110 transmits the requested resource(s) to the network computing provider 120 (4). Illustratively, the network computing provider 120 can process the request resource(s) in a variety of ways (5). For example, the browser software application on the network computing provider 120 can process at least a portion of the resources prior to sending the resources to the client computing device 102. Upon accessing the network resource and receiving any associated content from the content provider 110 (via the network computing provider 120) (6), the client computing device 102, such as through the software browser application 104, processes the requested resources and renders the received resources as appropriate (7). Although not illustrated in FIG. 2C, the processing of the resources by the software browser application 104 can include multiple iterative resource requests corresponding to an original resource (such as a Web page) and a number of embedded resources. One skilled in the relevant art will appreciate that rendering of the resource can result in the generation of one or more display objects on a display associated with the client computing device 102 (8). The display objects may correspond to the resource or be representative of the resource.

With reference to FIG. 2D, at some point after receiving, processing and rendering the network resources, the software browser application 104 obtains an input from a user that is interpreted as a selection of one or more of the display objects corresponding to the network resources and a command to access one or more network based services (9). Responsive to the selection of the display objects, the software browser application 104 can determine available actions or network based services based on a user account, meta-data associated with the resources, and the like. The list of available actions or network based services can be provided to a user in order to receive a selection of an action or selection of a network based service (10). For example, a user may be presented with a menu indicative of the availability of network based storage for selected image objects or the ability to post the selected image objects to a network based social network service.

As further illustrated in FIG. 2D, the software browser application 104 obtains a selection of the one of the available actions (11) and transmits the network based service request to the network computing provider 120 (12), which processes the request (13). For example, the network computing provider 120 can process a portion of the request, such as by identifying pointers to content or resources that may have already been processed by a corresponding network based service. Thereafter, the network computing provider 120 transmit a request (with appropriate information) to one or more network services 118 (14).

Figure 3:
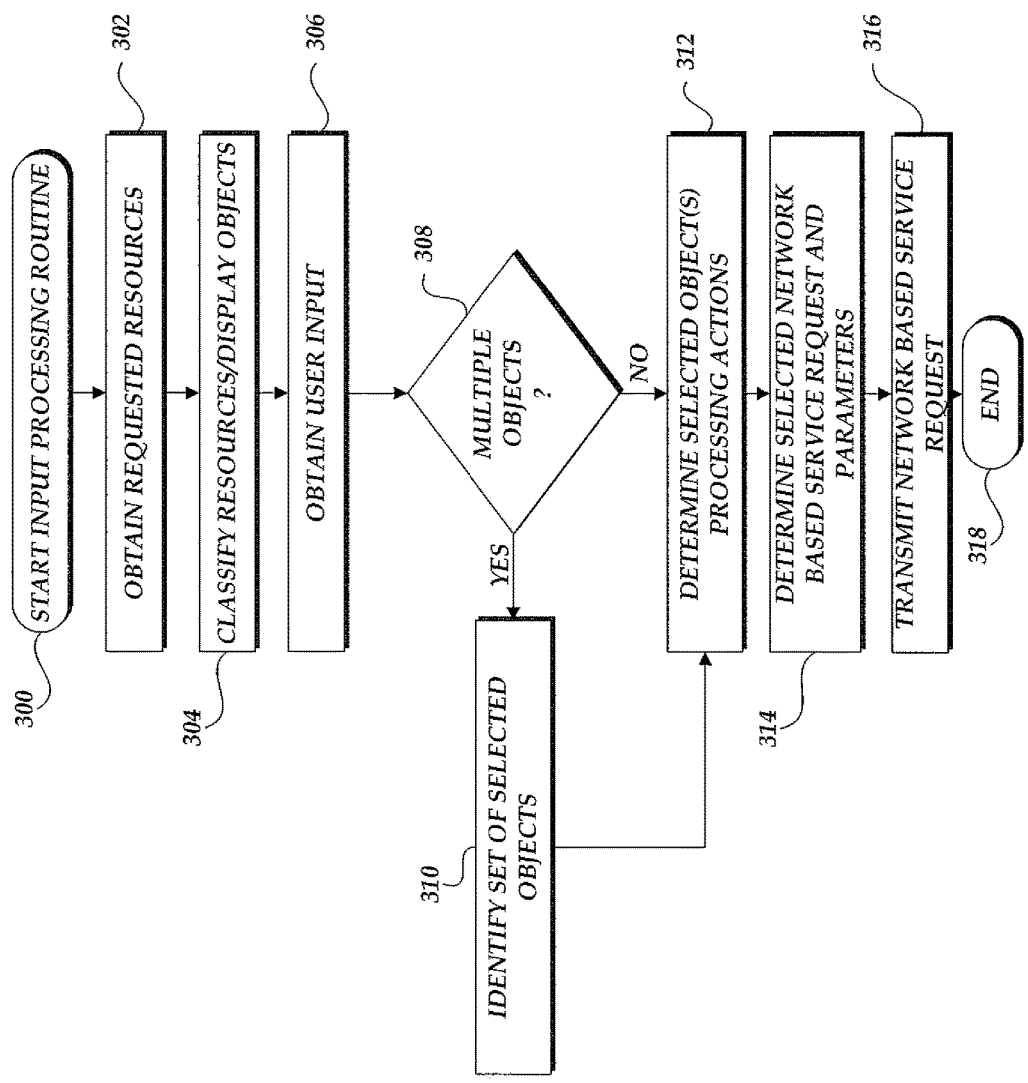
FIG. 3 is a flow diagram of an input processing routine implemented by a software browser application for processing network based service requests corresponding to received resources.

Turning now to FIG. 3, a routine 300 for processing network based service requests corresponding to received resources will be described. Illustratively, routine 300 will be described as being implemented by a software browser application 104 on a client computing device 102. However, one skilled in the relevant art will appreciate that routine 300, or portions thereof, may be implemented by one or more additional components of a content delivery environment 100, including, but not limited to, the network computing provider 120.

At block 302, the software browser application 104 obtains one or more resources based on a resource request initiated by (or on behalf of) a user. As previously discussed, in one embodiment, a client computing device 102 initiates a request for content by identification of a desired network service 118, such as via identification of a specific URL. In one example, the software browser application 104 receives an input of a specific URL to access, such via a keyboard associated with the client computing device 102. In another example, a user can manipulate a graphical user interface to select an object, such as a selection of an embedded hyperlink or selection of an entry in a "Favorites" listing. The manipulation of the graphical user interface results in the software browser application 104 receiving or recalling the information (e.g., the URL or network address) used to access the desired network service 118. Still further, upon accessing the network service and receiving any associated content from the content provider 110, the client computing device 102, such as through the software browser application 104, processes the requested resources and renders the received resources as appropriate. The processing of the resources by the software browser application 104 can include multiple iterative resource requests corresponding to an original resource (such as a Web page) and a number of embedded resources. One skilled in the relevant art will appreciate that rendering of the resource can result in the generation of one or more display objects on a display associated with the client computing device 102. The display objects may correspond to the resource or be representative of the resource.

At block 304, the software browser application 104 can classify the displayed objects in order to facilitate the selection of multiple objects by user input. In one example, the classification of the objects can correspond to an identification of common Meta-data or other information that will be used to group display objects and the underlying resources. For example, the software browser application 104 can group display objects that are provided by the same content provider 110 or that have a common network address. In another example, the software browser application 104 can sort objects based attributes of the resource, such as size of the file, dimensions of an image file, length of audio or video file, keywords, associated resolution, author, pricing plan, and the like. In another example, the software browser application 104 can classify objects based on historical information, such as previous interactions by the specific user or groups of users. In this example, a software browser application 104 may group a set of images based on historical information indicating that a majority of users grouped the set of images. One skilled in the relevant art will appreciate that additional or alternative groupings may also be implemented.

At block 306, the software browser application 104 obtains user input or indications of user input, such as via information provided to the input interface component 106. In one embodiment, the user input can correspond to a selection of a graphical icon or control provided by, or otherwise associated with, the software browser application 104. Example graphical icons and controls that are associated with a software browser application 104 will be described with regard to FIGS. 4A-4C. In another embodiment, the user input can correspond to a manipulation of various touch screen interfaces. An example screen interface related to touch screen interfaces will be described with regard to FIG. 4D. In a further embodiment, the user input can correspond to hardware controls, such as a dedicated hardware button or customized hardware control. In yet another embodiment, the input can correspond to audio commands or video-based commands. One skilled in the relevant art will appreciate that additional or alternative inputs may also be implemented.

At decision block 308, a test is conducted to determine whether the received input corresponds to a selection of multiple display objects corresponding to a set of resources. The determination of whether multiple display objects at decision block 308 can be based on various types of user input and interfaces and the grouping information generated by the software browser application 104. Examples of the selection of multiple objects will be described with regard to FIGS. 4A-4D. If at decision block 308, multiple objects are selected, the software browser application 104 identifies the set of selected objects at block 310. In one embodiment, the software browser application 104 may conduct additional processing to confirm the selection of the display objects or suggest modifications to the selection of multiple display objects, such as the suggested inclusion/exclusion of display objects.

If only a single object is selected at decision block 308 or once the set of multiple objects are selected at block 310, at block 312, the software browser application 104 determines processing actions for the set of selected objects. In an illustrative embodiment, the processing actions correspond to the type of processing or network based services that are available for the selected display objects. For example, the software browser application 104 may determine that the set of selected display objects may be stored on a network based storage service or posted to a social network. In another example, the software browser application 104 may determine that the set of selected network based services may be copied to a distribution service for transmitting to other client computing devices 102. In a further example, the software browser application 104 may utilize information services or other configuration information to determine that one or more network based services are unavailable. In this example, the software browser application 104 may determine that restrictions have been placed on one or more of the objects that prohibits distribution or network based storage.

At block 314, the software browser application 104 determines network based service parameters based on a selection of one or more of the available actions or network based services. In one embodiment, the network based service parameters can correspond to the identification of the resources to be processed. In one example, the software browser application 104 can utilize copies of the resources for purposes of initiating the service request. In another embodiment, the software browser application 104 can obtain identifiers or other pointers that do not require the transmission of the resources to the network based services. In another embodiment, the network based service parameters can include user or account identifiers, user configurations, authentication information or other configuration information that will be used to process the service request. For example, the software browser application 104 can recall or otherwise obtain naming convention configuration information for facilitating network based storage. In another example, the software browser application 104 can obtain third party information, such as location information to include in the network based service request. In still a further example, the software browser application 104 can collect additional information to be associated with the resources, such as text to accompany image files posted on a network service.

At block 316, the software browser application 104 transmits the network based service requests with any appropriate service parameter information. As illustrated in FIGS. 1 and 2, the software browser application 104 may transmit the service request directly to one or more network service providers 118. Alternatively, the software browser application 104 may transmit the request to the network computing provider 120, which forwards the request to one or more network service providers 118. At block 318, the routine 300 ends.

Figure 4A:
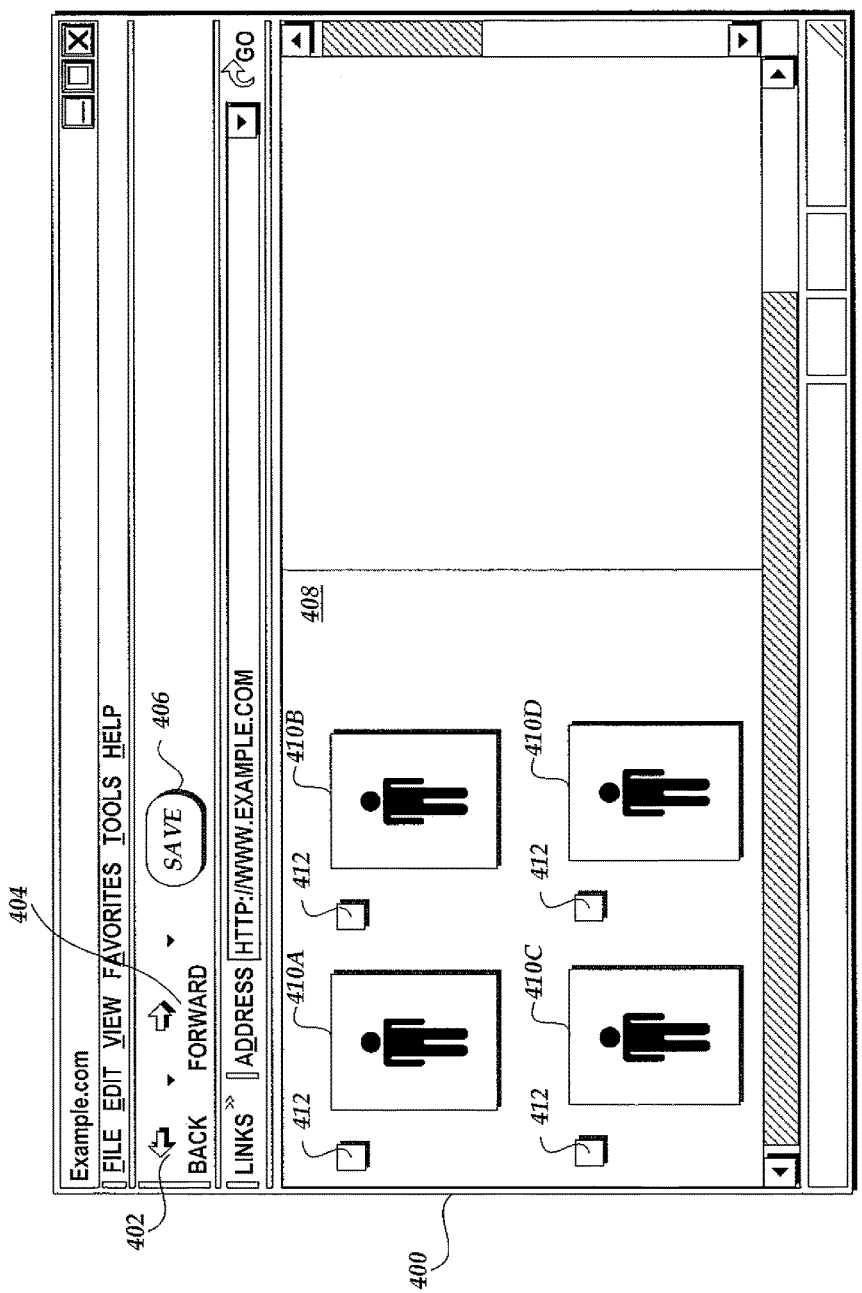
FIGS. 4A-4D are block diagrams illustrative of various screen interfaces generated by a software browser application for obtaining network based service requests corresponding to displayed resources.

FIGS. 4A-4d are block diagrams illustrative of various screen interfaces generated by a software browser application 104 for presenting, among other controls, one or more graphical icons or controls corresponding to a request for network based services. With reference to FIG. 4A, in one embodiment, a screen interface 400 generated by a software browser application 104 displays a set of controls that are presented to users as they access a network resource. The set of controls can include a first control 402 reflective of a command to access a previously accessed network resource without deleting any browser information (e.g., a traditional "back button"). The screen display 400 can also include a second control 406, such as a forward button, for additional navigation control. The screen display 400 can also include a third control 406 that corresponds to one or more network based services. As illustrated in FIG. 4A, the third control 406 corresponds to a request for network based storage. Illustratively, the controls 402, 404, and 406 include both graphics and text to indicate to a user the intended configuration of the respective control.

With continued reference to FIG. 4A, the screen display 400 includes at least one portion 408 for displaying display objects 410A-410D. Each display object 410A-410D includes a separate control 412 for selecting the display object. As discussed above, the selection of the third control 406 causes the software browser application 104 to request the network based service request (e.g., a network based storage request) for any selected display objects.

Figure 4B:
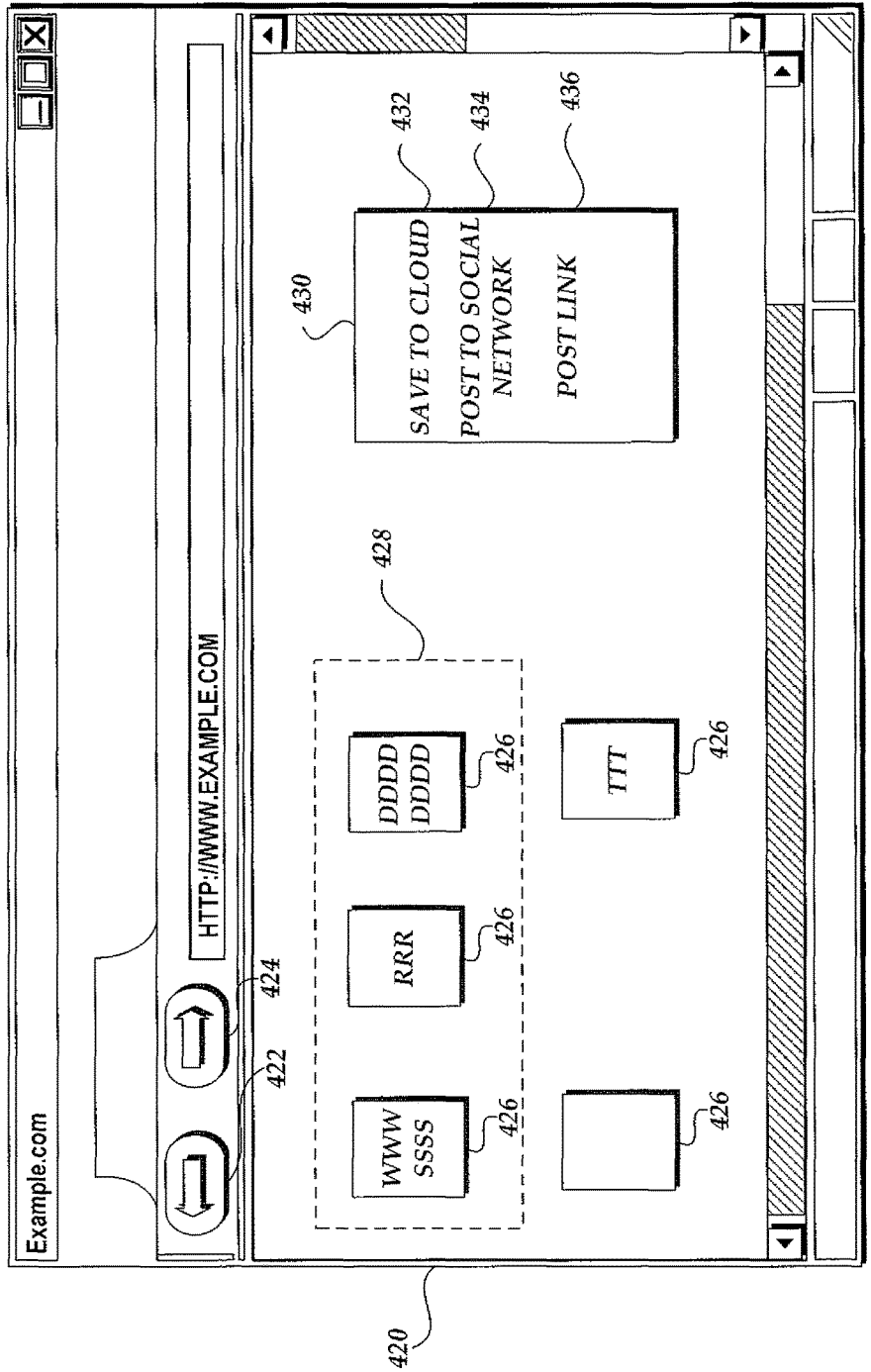

With reference to FIG. 4B, in another embodiment, a screen interface 420 generated by a software browser application 104 displays a set of controls that are presented to users as they access a network resource. The set of controls include a first control 422 reflective of a command to access a previously accessed network resource and a second control 424, such as a forward button, for additional navigation control. As illustrated in FIG. 4B, the controls 422 and 424 include only graphics to indicate to a user the intended configuration of the respective control. The screen display 420 also includes a number of display objects 426, which may be selectable by a user via one of a variety of user interfaces.

As illustrated in FIG. 4B, in one embodiment, a user may cause the selection of multiple display objects by using a bound box 428 in which all display objects encompassed in the bound box are considered selected. In one aspect, the bounding box may be generated by manipulation of a pen or mouse selection tool. In another aspect, the bounding box may be generated by a touch screen interface in which a user's finger create the shape of the bounding box or indicate the scale. Illustratively, any display object not encompassed the bounding box 428 is considered selected. Unlike the screen display 400, the screen display 420 does not have a dedicated control for initiating a network based service request. In this embodiment, a user can activate a menu 430 for initiating available service requests by manipulation of buttons, voice commands or gestures. The menu 430 includes an identification of three available network based services 432, 434, and 436, which may be selected via one of many input techniques.

Figure 4C:
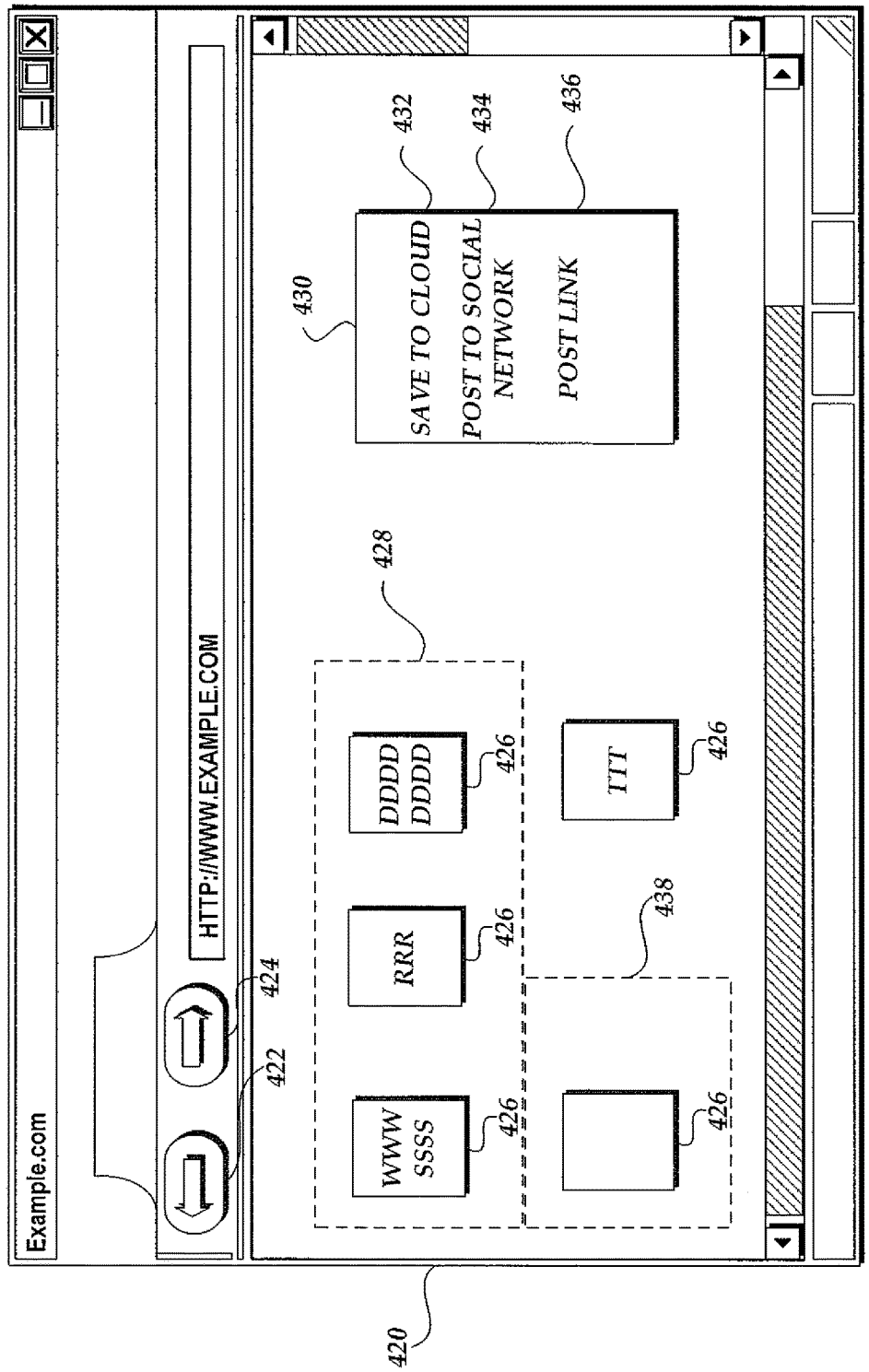

With reference to FIG. 4C, in a further embodiment, the screen interface 420 can include additional information provided by the software browser application 104 to facilitate the selection of multiple display objects by a user. As illustrated in FIG. 4C, the screen display 420 includes a second bounding box 438 that identifies an additional display object for possible inclusion in the previous selection of display objects. As previously described, the suggestion for additional selection of display objects can be based on historical information from the specific user or from groups of users. Additionally, the suggestion for additional selection of display objects can be based on matching Meta-data or other organizational criteria.

Figure 4D:
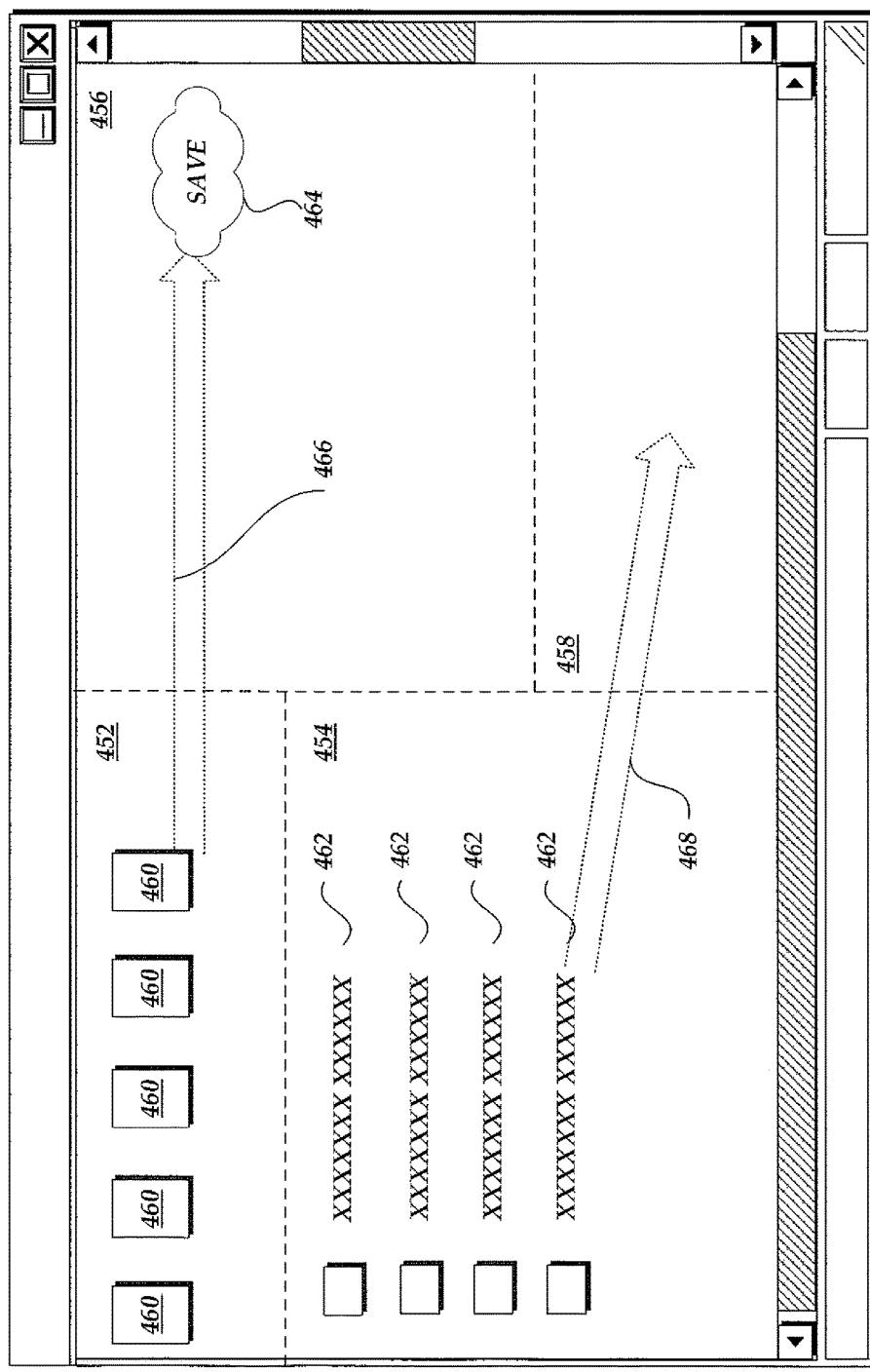

With reference to FIG. 4D, in an embodiment in which some portion of the screen interface 450 may correspond to a touch interface, the software browser application 104 may utilize physical touch gestures or movements to obtain input indicative of a selection of the integrated command. As illustrated in FIG. 4D, the screen display 450 does not necessarily have any graphical icons or controls that are displayed to users as they access a network resource, such as the controls illustrated in FIGS. 4A-4C. In alternative embodiments, however, one or more controls may be provided or displayed in conjunction with this embodiment.

For purposes of an illustrative embodiment, the screen display 450 can be divided into a number of subareas 452, 454, 456, and 458 for displaying objects or for obtaining input corresponding to network service request commands. For example, subarea 452 may be configured to display a first set of display objects 460 while subarea 454 may be configured to display a second set of display objects 462. In one embodiment, the screen display 450 can include a display object 464 that can be manipulated (as illustrated at 466) to elicit a network based service request. In another embodiment, the placement of a display object in subarea 458 may elicit the same or a different network based request.

Still further, a length of time in which an object is selected may also be utilized in the selection of display objects or the determination of whether a network based service request has been selected.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing information associated with network resources comprising:
   a computer-readable memory storing an executable browser application; and
   one or more physical processors in communication with the computer-readable memory, wherein the one or more physical processors execute the browser application to at least:
   obtain a plurality of network resources from one or more content providers via a communication network;
   determine a group of network resources based at least partly on one or more attributes of individual network resources of the plurality of network resources;
   obtain input corresponding to selection of at least a first network resource of the group of network resources;
   obtain input corresponding to selection of at least one command indicative of a network based storage request for the first network resource; and
   in response to the selection of at least one command:
   obtain automatically at least one network based storage parameter to be associated with the first network resource; and
   transmit, to a network-based storage service separate from the one or more content providers, a network based storage request corresponding to the obtained input, the network based storage request including the at least one network based storage parameter, a reference to the first network resource at a content provider of the one or more content providers, and a request for the network-based storage service to obtain and store the first network resource, wherein the browser application does not transmit the first network resource to the network-based storage service.

2. The system as recited in claim 1, wherein one or more network resources are grouped based on meta-data associated with the network resources.

3. The system as recited in claim 1, wherein the attributes of the individual network resources includes at least one of a file size, a network address, a dimension, a length and a naming convention.

4. The system as recited in claim 1, wherein the one or more physical processors are further programmed to at least obtain a selection of multiple grouped network resources.

5. The system as recited in claim 1, wherein the network based storage parameter includes a naming convention.

6. The system as recited in claim 1, wherein the network based storage parameter includes at least one of an account identifier and a user identifier.

7. A computer-implemented method for managing information associated with network resources comprising:
   under control of one or more processors configured with specific executable instructions,
   obtaining a plurality of network resources from one or more content providers via a communication network;
   identifying a group of network resources based on the plurality of network resources;
   obtaining an input, wherein the input is received with regard to a selection of a network resource of the group of network resources;
   obtaining a selection of a network based service to be requested in connection with the network resource;
   obtaining automatically at least one network based service parameter corresponding to the selected network based service; and transmitting a network based service request to the selected network based service, the network based service request including the at least one network based service parameter, a reference to the network resource at a content provider of the one or more content providers, and a request for the network based service to obtain and store the network resource, wherein the selected network based service is separate from the one or more content providers.

8. The computer-implemented method of claim 7, wherein obtaining a selection of a network based service includes obtaining an input corresponding to a selection of graphical icon, the graphical icon reflective of an identified network based service.

9. The computer-implemented method of claim 7, wherein the network based service request corresponds to a network based storage request.

10. The computer-implemented method of claim 9, wherein the network based storage parameter includes at least one of a naming convention, an account identifier, and a user identifier.

11. The computer-implemented method of claim 7, wherein determining the group is based on meta data of the individual network resources.

12. The computer-implemented method of claim 7, wherein obtaining a selection of a network based service for the network resource includes:
    determining a set of network based services that are available for the network resource; and
    obtaining a selection of at least one of the set of network based services.

13. Non-transitory computer-readable storage comprising computer-readable instructions that, when executed, instruct a processor to perform a method comprising:
    obtaining a plurality of network resources from one or more content providers via a communication network;
    identifying a group of network resources of the plurality of network resources;
    causing generation of a first selectable component, the first selectable component reflective of a command to select a network resource of the group of network resources; and
    responsive to an obtained input corresponding to selection of a network based service to be requested in connection with the network resource:
        obtaining automatically at least one network based service parameter corresponding to the network based service; and
        causing the processing of a request for the network based service to obtain and store the network resource, wherein the request includes the at least one network based service parameter, and a reference to the network resource at a content provider of one or more content providers.

14. The non-transitory computer-readable storage of claim 13, wherein the network based service request corresponds to a network based storage request.

15. The non-transitory computer-readable storage of claim 13, wherein the network based storage parameter includes at least one of a naming convention, an account identifier, and a user identifier.

16. The non-transitory computer-readable storage of claim 13, wherein determining the group is based on meta data regarding individual network resources of the plurality of network resources.

17. The non-transitory computer-readable storage of claim 13, wherein obtaining a selection of a network based service request for the network resource includes:
    determining a set of network based services that are available for the network resource; and
    obtaining a selection of at least one of the set of network based services.

18. The computer-implemented method of claim 7, wherein the transmitting the network based service request is performed by a browser application, and wherein the browser application does not transmit the first network resource to the network-based storage service.

19. The non-transitory computer-readable storage of claim 13, wherein the non-transitory computer-readable storage further comprises computer-readable instructions to execute a browser application, wherein the browser application causes the processing of the request, and wherein the browser application does not transmit the first network resource to the network-based storage service.

* * * * *